(12) United States Patent
Mashiba

(10) Patent No.: US 9,181,057 B2
(45) Date of Patent: Nov. 10, 2015

(54) STEPPING MOTOR CONTROL DEVICE AND CONVEYING DEVICE PROVIDED WITH THE SAME

(71) Applicant: Sharp Kabushiki Kaisha, Osaka (JP)

(72) Inventor: Tamaki Mashiba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/528,512

(22) Filed: Oct. 30, 2014

(65) Prior Publication Data

US 2015/0145202 A1    May 28, 2015

(30) Foreign Application Priority Data

Nov. 28, 2013    (JP) ................................ 2013-245965

(51) Int. Cl.
| | | |
|---|---|---|
| H02P 8/00 | (2006.01) | |
| H02P 8/14 | (2006.01) | |
| B65H 7/20 | (2006.01) | |
| H02P 8/12 | (2006.01) | |
| H02P 8/16 | (2006.01) | |
| H02P 8/18 | (2006.01) | |
| H02P 8/10 | (2006.01) | |

(52) U.S. Cl.
CPC .. *B65H 7/20* (2013.01); *H02P 8/10* (2013.01); *H02P 8/12* (2013.01); *H02P 8/14* (2013.01); *H02P 8/16* (2013.01); *H02P 8/18* (2013.01)

(58) Field of Classification Search
CPC ............... H02P 8/14; H02P 8/10; H02P 8/12; H02P 8/18; H02P 8/16
See application file for complete search history.

(56) References Cited

U.S. PATENT DOCUMENTS 6,459,229 B1 * 10/2002 Kawanabe ..................... 318/696
8,471,517 B2 *  6/2013 Kim et al. ...................... 318/696
2004/0012353 A1   1/2004 Seima et al.

FOREIGN PATENT DOCUMENTS

| JP | 06-233571 A | 8/1994 |
|---|---|---|
| JP | 08-009104 A | 1/1996 |
| JP | 2004-007894 A | 1/2001 |
| JP | 2004-215461 A | 7/2004 |

\* cited by examiner

*Primary Examiner* — Luis A Gonzalez
(74) *Attorney, Agent, or Firm* — Renner, Otto, Boisselle & Sklar, LLP

(57) ABSTRACT

A stepping motor control device includes a driving IC driving a stepping motor by PWM control, and a setting circuit for setting PWM frequency of the driving IC. The setting circuit sets the driving IC such that in stepping motor accelerating and decelerating periods, the PWM frequency of the driving IC becomes higher than the PWM frequency of the driving IC in a constant-speed period of the stepping motor. Thus, power loss of the driving IC in the stepping motor accelerating and decelerating periods can be reduced, and ripple current can be reduced.

5 Claims, 14 Drawing Sheets

STEPPING MOTOR CONTROL DEVICE AND CONVEYING DEVICE PROVIDED WITH THE SAME

CROSS-REFERENCE TO RELATED APPLICATION

This nonprovisional application claims priority under 35 U.S.C. §119(a) on Patent Application No. 2013-245965 filed in Japan on Nov. 28, 2013, the entire contents of which are hereby incorporated by reference.

BACKGROUND OF THE INVENTION

1. Field of the Invention

The present invention relates to a device for controlling a stepping motor used, for example, for conveying a sheet of recording paper in a copy machine. More specifically, the present invention relates to a control device for a stepping motor enabling reduction of power loss and reduction of ripple current of a stepping motor driving IC at the time of acceleration and deceleration without necessitating the conventional current switching circuit, as well as to a conveyer device provided with the control device.

2. Description of the Background Art

As one type of image processing apparatuses as electronic equipment, an MFP (MultiFunction Peripheral) has been known. An MFP has a plurality of functions, including copy, print, facsimile (hereinafter also denoted as FAX) and scanner functions. The MFP allows a user to readily copy, send FAX or print. In MFPs and the like, a stepping motor is used as a motor for driving rollers for conveying recording paper and for automatically reading documents.

Generally, high torque is required at the time of acceleration/deceleration of a stepping motor (when the stepping motor is accelerated or decelerated). The stepping motor is controlled such that a motor control current is increased at the time of acceleration/deceleration to increase motor output, and the motor control current is decreased at a steady state (while the motor is rotating at a constant speed), as the torque becomes lower, for example, than at the time of activation. For this purpose, a conventional stepping motor control circuit is provided with a current switching circuit, and current value of the stepping motor is switched in accordance with the state of the stepping motor (whether it is accelerated/decelerated or in a steady state).

Further, a method of control that decreases lost heat of an element by lowering PWM frequency while a high current is caused to flow during acceleration/deceleration has been proposed. For example, Japanese Patent Laying-Open No. 2004-7894 (hereinafter referred to as '894 Reference) discloses a control device that lowers PWM frequency at the time of activation, as a solution to a problem that, without any function of switching the PWM frequency, if the PWM frequency is set high to increase accuracy of rotation, a high current is caused to flow at the time of activating a motor, and power loss undesirably increases when a driving transistor switches.

As described above, conventional control is such that the current value is decreased when the stepping motor is accelerated/decelerated. Such control requires a current switching circuit for switching the current value. Further, even when the value of effective current is the same as at the steady state, peak current increases during acceleration and, therefore, a power source that can supply the high peak current becomes necessary. In addition, there is a problem that ripples of driving current become larger during acceleration than in the steady state. These problems cannot be solved by the technique disclosed in '894 Reference.

SUMMARY OF THE INVENTION

Therefore, in view of the problems described above, it is desirable to provide a control device for a stepping motor that can reduce power loss of stepping motor driving IC and reduce the ripple current in stepping motor accelerating and decelerating periods without necessitating the conventional current switching circuit, and to provide a conveyer device provided with the control device.

According to a first aspect, the present invention provides a stepping motor control device. The control device includes: a driving unit driving the stepping motor by PWM control; and a control unit controlling the driving unit. The control unit controls the driving unit such that in a period in which the stepping motor is kept rotating at a constant speed, the driving unit drives the stepping motor with a first PWM frequency, and in a period of accelerating or decelerating rotation of the stepping motor, the driving unit drives the stepping motor with a second PWM frequency. The second PWM frequency is higher than the first PWM frequency.

Preferably, the control unit controls the driving unit such that the stepping motor is driven with a PWM frequency in the period of accelerating rotation of the stepping motor different from a PWM frequency in the period of decelerating rotation of the stepping motor.

More preferably, the control unit determines an end of the period in which the stepping motor is kept rotating at the constant speed, an end of the period of accelerating or an end of the period of decelerating, by counting the number of control steps of the driving unit.

More preferably, the control device further includes a detecting unit detecting speed of rotation of the stepping motor. The control unit determines an end of the period in which the stepping motor is kept rotating at the constant speed, an end of the period of accelerating or an end of the period of decelerating, by the speed of rotation of the stepping motor detected by the detecting unit.

According to a second aspect, the present invention provides a conveying device, including: the above-described control device and a stepping motor; and the stepping motor conveys an object, under the control by the control device.

The present invention enables reduction of power loss of the driving unit (driver IC) during the accelerating or decelerating period of rotation of the stepping motor, and reduction of ripple current. Further, during the accelerating or decelerating period of rotation of the stepping motor, the stepping motor can be controlled with the current value comparable to that in the constant-speed rotation period and, therefore, the conventional current switching circuit becomes unnecessary. Further, it is unnecessary to use a power source that can supply large peak current.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
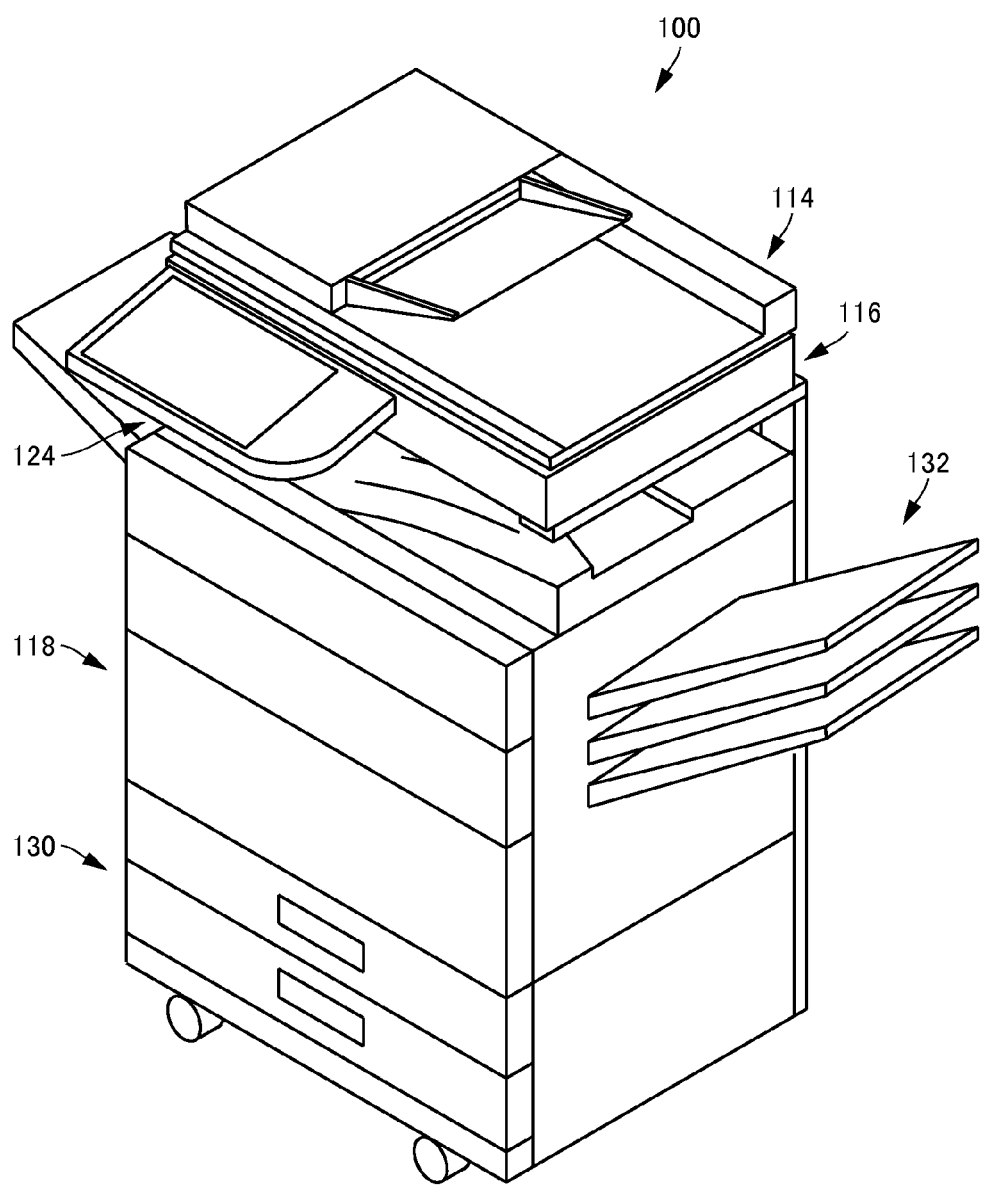
FIG. 1 is a perspective view showing an image processing apparatus provided with the stepping motor control device in accordance with a first embodiment of the present invention.

In the following embodiment, the same components are denoted by the same reference characters. Their names and functions are also the same. Therefore, detailed description thereof will not be repeated.

First Embodiment

An image processing apparatus including the stepping motor control device in accordance with the first embodiment of the present invention is a digital multifunction peripheral having a plurality of functions, including copy, facsimile, scanner and printer functions. Referring to FIG. 1, image processing apparatus 100 includes an automatic document feeder 114, a document reading unit 116, an image forming unit 118, an operation unit 124, a paper feed unit 130, and a paper discharge unit 132. Operation unit 124 includes a touch-panel display and an operation key portion (neither being shown). Operation unit 124 receives inputs such as instructions to image processing apparatus 100 by a user.

Figure 2:
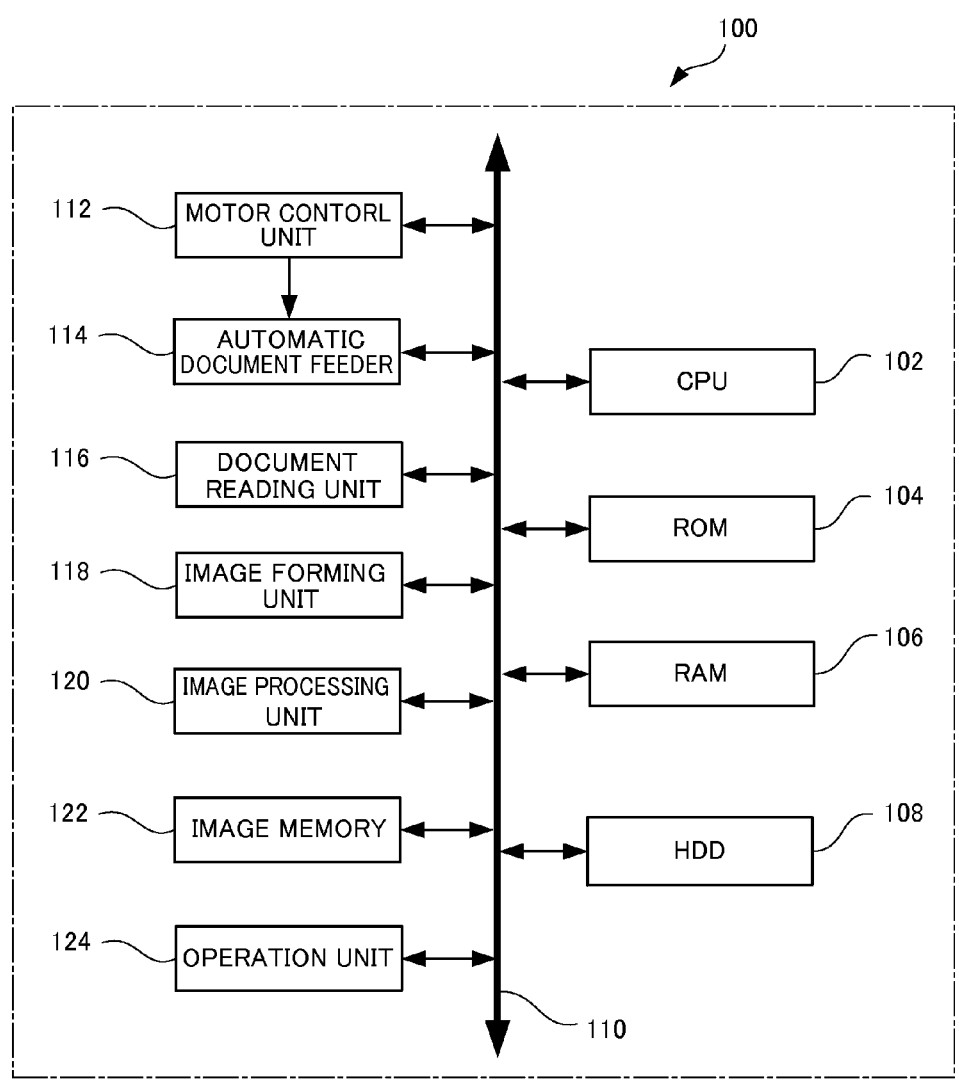
FIG. 2 is a block diagram schematically showing a configuration of the image processing apparatus shown in FIG. 1.

Referring to FIG. 2, image processing apparatus 100 includes a CPU (Central Processing Unit) 102 for overall control of image processing apparatus 100, an ROM (Read Only Memory) 104, an RAM (Random Access Memory) 106 and an HDD (Hard Disk Drive) 108. ROM 104 is a non-volatile storage device that retains data even when power is turned off. ROM 104 stores programs and data necessary for controlling operations of image processing apparatus 100. RAM 106 is a volatile storage device. HDD 108 is a non-volatile storage device.

Image processing apparatus 100 further includes a bus 110, a motor control unit 112, an image processing unit 120 and an image memory 122. Motor control unit 112 controls a motor provided in automatic document feeder 114. CPU 102, ROM 104, RAM 106, HDD 108, motor control unit 112, automatic document feeder 114, document reading unit 116, image forming unit 118, image processing unit 120, image memory 122 and operation unit 124 are connected to bus 110. Data (including control information) is exchanged among these components through bus 110.

CPU 102 reads a program from ROM 104 to RAM 106 through bus 110, and executes the program using a part of RAM 106 as a work area. Specifically, CPU 102 controls various units and components forming image processing apparatus 100 in accordance with the program or programs stored in ROM 104 and thereby realizes various functions of image processing apparatus 100.

Image processing apparatus 100 includes an NIC (Network Interface Card) and a FAX modem (neither being shown). The NIC is connected in a wired or wireless manner to an external network, and it serves as an interface enabling communication of image processing apparatus 100 with an external device through the network. The FAX modem is connected to an external telephone line (not shown), and it serves as an interface enabling FAX communication of image processing apparatus 100 with an external device.

CPU 102 monitors user operations on the touch-panel display and keys on the operation key portion provided at operation unit 124, and executes the copy, printer, scanner and facsimile functions in accordance with the user operations. In accordance with the functions to be executed, document reading unit 116 is used for generating image data.

Document reading unit 116 includes a CCD (Charge Coupled Device) for reading an image, and a document detection sensor for detecting a document placed on a platen or on automatic document feeder (such as a Reverse Single Path Feeder: RSPF) 114. Document reading unit 116 reads a document and inputs image data. The image data is temporarily stored in image memory 122. Image processing unit 120 executes various image processing operations on the read image data. Image forming unit 118 prints image data on recording paper. Sheets of recording paper for image formation are stored in paper feed unit 130. Recording paper drawn out from paper feed unit 130 is conveyed inside image forming unit 118 by means of conveyer rollers, and an image is printed thereon. The image data is stored in HDD 108 as needed.

Figure 3:
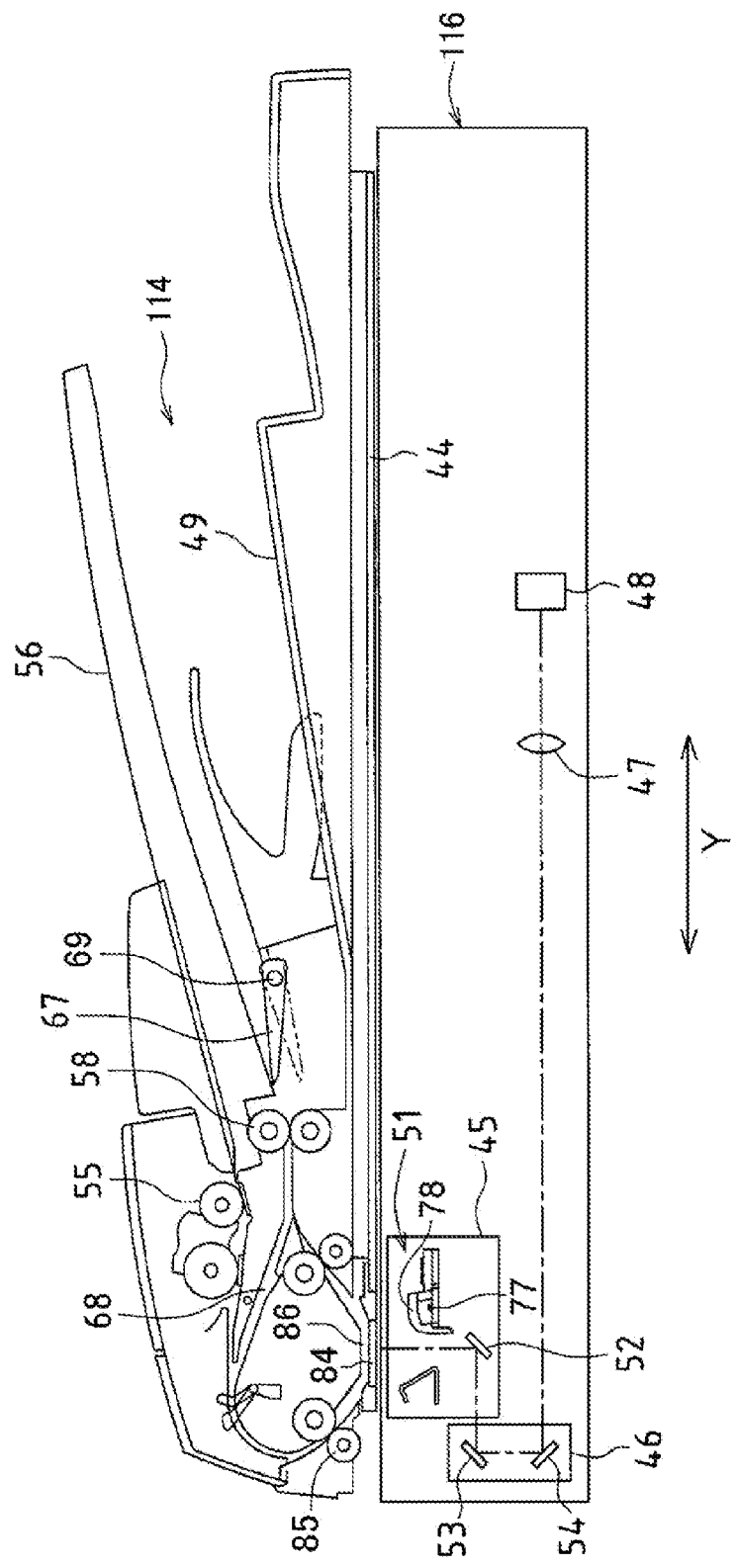
FIG. 3 is a cross-sectional view schematically showing a configuration of a document reading device.

Referring to FIG. 3, automatic document feeder 114 has a back side edge pivotally supported by means of a hinge (not shown) on a back side of document reading unit 116, and the feeder is opened/closed by moving upward/downward the front portion. When automatic document feeder 114 is opened, a platen glass 44 of document reading unit 116 is exposed and a document can be placed on platen glass 44.

Document reading unit 116 includes platen glass 44, a first scanning unit 45, a second scanning unit 46, an image forming lens 47, CCD 48 and the like. When a document placed on platen glass 44 is to be read, the first and second scanning units 45 and 46 are used.

The first scanning unit 45 includes an illuminating device 51 and a first reflection mirror 52. Illuminating device 51 includes an LED array 77 and an optical guide member 78. The first scanning unit 45 exposes the document on platen glass 44 with illuminating device 51, while it moves in a sub-scanning direction Y by a distance corresponding to the document size, at a constant speed V. Reflected light is reflected by first reflection mirror 52 and led to the second scanning unit 46. Thus, an image on a surface of the document (including color or monochrome characters, figures, photographs and the like) is scanned in the sub-scanning direction Y.

The second scanning unit 46 includes a second reflection mirror 53 and a third reflection mirror 54. The second scanning unit 46 moves at a speed V/2 following the first scanning unit 45, while reflecting the light reflected from the document by the second and third reflection mirrors 53 and 54 to image forming lens 47. Image forming lens 47 collects the light reflected from the document to CCD 48, and forms an image on the surface of the document on CCD 48. CCD 48 repeatedly scans the document image in a main scanning direction (vertical to the sheet of FIG. 3), and at every scan, outputs an analog image signal of one main scanning line. Thus, the document is scanned and the image data is generated.

In addition to a stationary document placed on platen glass 44, document reading unit 116 can also read an image on a surface of a document fed by automatic document feeder 114. In that case, the first scanning unit 45 is moved to a reading area below a document reading glass 84 as shown in FIG. 3, and the second scanning unit 46 is arranged in accordance with the position of first scanning unit 45. Feeding of a document by automatic document feeder 114 starts in this state.

In automatic document feeder, a pick-up roller 55 is pressed to a document on a document tray 56 and in this state, the roller is rotated, whereby one document is drawn and fed. Leading edge of the document abuts a registration roller pair 85 and aligned. Thereafter, the document is passed between document reading glass 84 and a reading guide plate 86, and discharged through a discharge roller pair 58 to a paper discharge tray 49.

While the document is being conveyed, a surface of the document is irradiated through document reading glass by illuminating device 51 of the first scanning unit 45. Light reflected from the surface of document is guided by reflection mirrors of the first and second scanning units 45 and 46 to image forming lens 47, and by image forming lens 47, collected to CCD 48. Specifically, the image on the document surface is formed on CCD 48. In this manner, the image on the document surface is read.

When a back surface of a document is to be read, an intermediate tray 67 is rotated about its axis 69 as indicated by a chain double-dashed line. In this state, while the document is being conveyed from paper discharge roller pair 58 to paper discharge tray 49, paper discharge roller pair 58 is stopped and the document is received on intermediate tray 67. In this state, paper discharge roller pair 58 is rotated in reverse direction, so that the document is guided through a reverse conveying path 68 to registration roller pair 85, whereby the document is reversed. The image on the back surface of the document is read in the similar manner as the image on the front surface. Thereafter, intermediate tray 67 is returned to the original position indicated by the solid line, and the document is discharged from paper discharge roller pair 58 to paper discharge tray 49.

Figure 4:
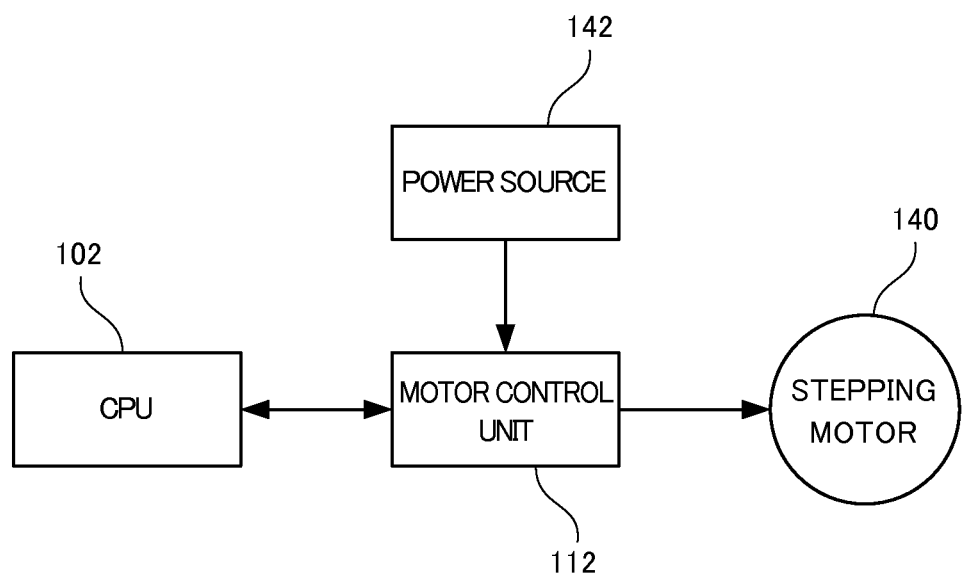
FIG. 4 is a block diagram showing a configuration of the stepping motor control device.

For driving pick-up roller 55, registration roller pair 85 and paper discharge roller pair 58 of automatic document feeder 114, stepping motors are used. Referring to FIG. 4, a stepping motor 140 included in automatic document feeder 114 is controlled by a motor control unit 112. Motor control unit 112 receives a prescribed electric power from a power source 142, and it is controlled by a control signal from CPU 102.

Figure 5:
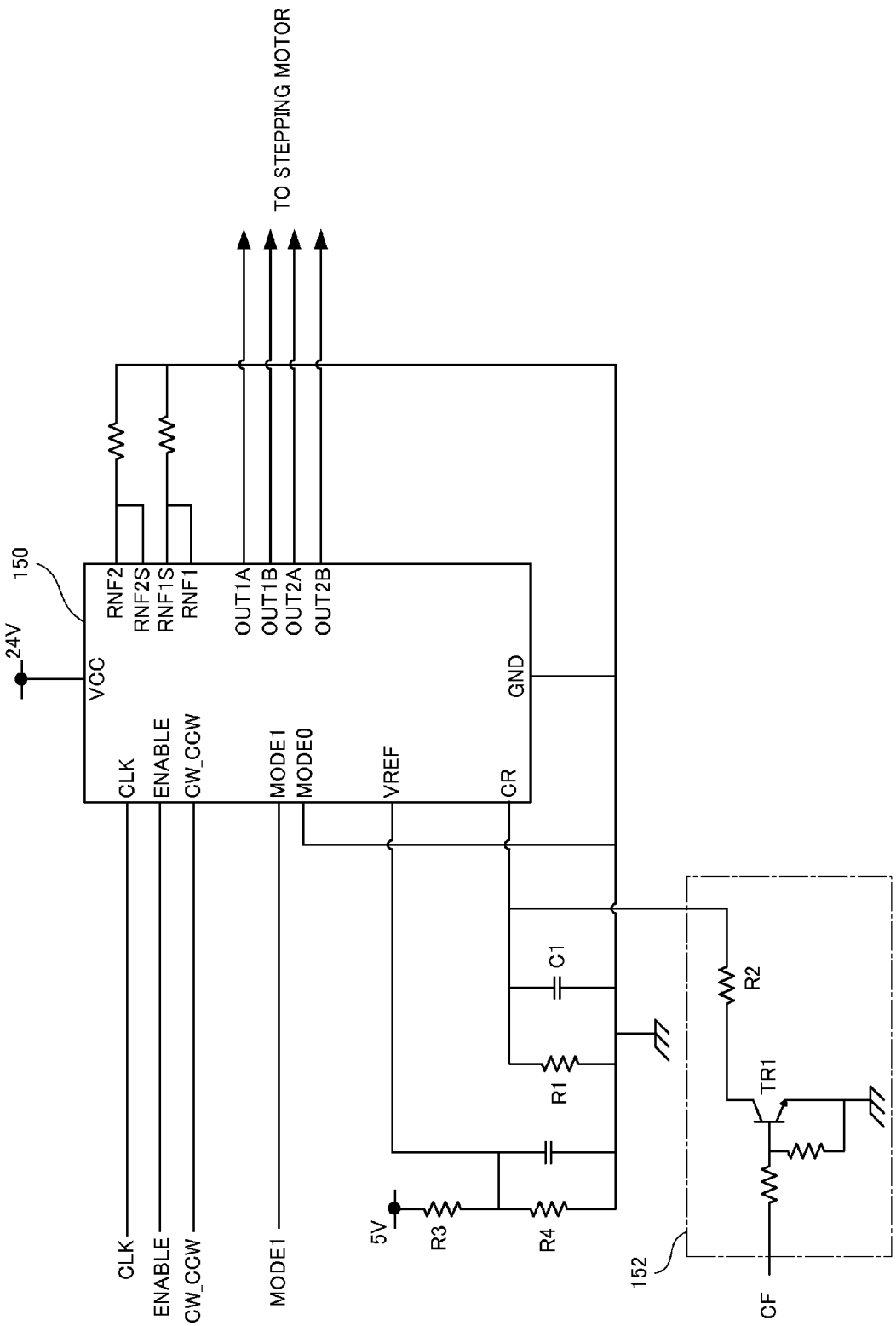
FIG. 5 is a circuit diagram showing a motor control unit.

Referring to FIG. 5, motor control unit 112 includes a driver IC 150 and a frequency switching circuit 152 for driving the stepping motor. Driver IC 150 is a known IC that generates a control signal for operating the stepping motor by PWM control. By way of example, a bipolar PWM constant current driving driver BD63715EFV manufactured by ROHM Semiconductor may be used. Any IC other than the above that drives the stepping motor by PWM control may be used.

Here, description will be given assuming that driver IC BD63715EFV manufactured by ROHM Semiconductor is used as driver IC 150. To driver IC 150, a control signal is input from CPU 102, whereby operation conditions are set up, and driver IC 150 outputs a control signal (H bridge output) of a prescribed frequency to stepping motor 140.

Driver IC 150 has its GND terminal grounded. To CLK terminal, ENABLE terminal, CW_CCW terminal and MODE1 terminal of driver IC 150, control signals from CPU 102 are input. In FIG. 5, the input control signals are denoted by the same reference characters as the names of respective terminals of driver IC 150.

To CLK terminal, a phase-advancing clock signal is input. At every rise of phase-advancing clock signal CLK, an electrical angle, which is the minimal angle for rotating the stepping motor, is advanced by one. ENABLE terminal is an output enabling terminal. When a high-level signal is input to ENABLE terminal, H bridge output signals OUT1A-OUT2B are output. CW-CCW terminal is a terminal for setting the direction of rotation of the motor. When CW-CCW terminal is set to the low-level, an H bridge output signal for rotation to the right (clockwise direction) is output. When CW_CCW terminal is set to the high-level, an H bridge signal for rotation to the left (counter-clockwise direction) is output. MODE0 and MODE1 terminals are for setting motor magnetic excitation mode of driver IC 150. In accordance with the combinations of levels of MODE0 and MODE1 signals, four different modes can be set. In FIG. 5, MODE0 is grounded (set to the low-level) and, therefore, switching between two modes is possible in accordance with the signal level input from CPU 102 to MODE1 terminal.

VREF terminal is for setting an output current value. In FIG. 5, VREF terminal is set to a constant value determined by resistive division of 5V by resistors R3 and R4. For example, R3=6.8 (kΩ) and R4=1.2 (kΩ).

CR terminal is for setting frequency of PWM control signal (PWM frequency). By a resistor and capacitor connected between CR terminal and the ground, the PWM frequency is determined.

A frequency switching circuit 152 is a circuit for changing resistance value between the CR terminal and the ground. To frequency switching circuit 152, a frequency switching signal CF is input from CPU 102. When a low-level frequency switching signal CF is input, a transistor TR1 turns off and there will be a resister R1 connected between the CR terminal and the ground. When a high-level frequency switching signal CF is input, transistor TR1 turns on, and there will be resistors R1 and R2 are connected in parallel between the CR terminal and the ground. By way of example, if C1=470 (pF), R1=39 (kΩ) and R2=15 (kΩ) and the frequency switching signal CF is at the low level, PWM frequency is 24 kHz. When the frequency switching signal CF is at the high level, PWM frequency is 82 kHz. When the frequency switching signal CF is at the high level, the resistance value between the CR terminal and the ground (combined resistance of R1 and R2 connected in parallel) is 10.8 kΩ.

RNF1 and RNF2 terminals are terminals connected to resistors for detecting output currents, which are grounded through prescribed resistances. RNF1S and RNF2S terminals are input terminals to a current detecting comparator in driver IC 150. RNF1 terminal is connected to RNF1S terminal, and RNF2 terminal is connected to RNF2S terminal.

OUT1A and OUT1B terminals are connected to opposite ends of one coil forming the stepping motor. OUT2A and OUT2B terminals are connected to opposite ends of another coil forming the stepping motor. While ENABLE terminal is set at the high level, H bridge signal is output from each of OUT1A, OUT1B, OUT2A and OUT2B terminals and input to stepping motor 140. The output signals from OUT1A, OUT1B, OUT2A and OUT2B terminals are pulse signals synchronized with clock signal CLK, for rotating the stepping motor in the direction determined by the level of CW_CCW terminal. The output signals of OUT1B and OUT2B terminals are inverted signals of OUT1A and OUT2A terminals, respectively.

Driver IC 150 includes terminals other than those shown in FIG. 5, and these terminals are set to prescribed levels through resistors and the like as needed.

Figure 6:
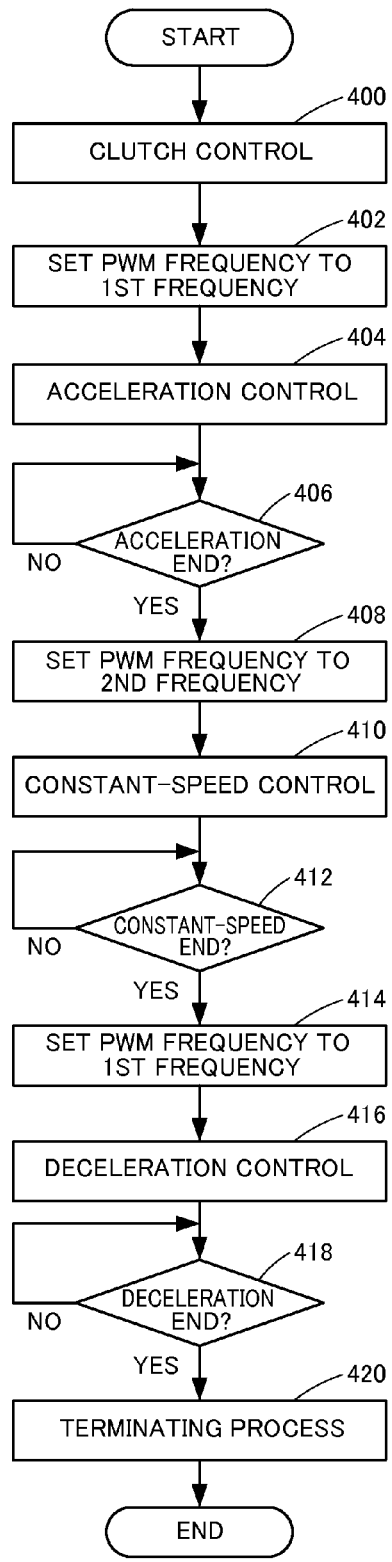
FIG. 6 is a flowchart representing a control structure of a program executed by the stepping motor control device shown in FIG. 4.

Referring to FIG. 6, a description will be given of a program controlling stepping motor 140 using motor control unit 112 shown in FIG. 5 while image processing apparatus 100 executes a prescribed function. The program is activated when automatic document feeder 114 is used.

At step 400, CPU 102 sets a clutch control signal to a high level to transmit driving of the stepping motor to an object of driving, so that the stepping motor and the object of control are coupled. The object of control is, as described above, the rollers in automatic document feeder 114.

At step 402, CPU 102 sets the PWM frequency of driver IC 150 to a first frequency. Specifically, CPU 102 sets frequency switching signal CF to the high level. Thus, PWM frequency is set to 82 kHz, as described above. Further, CPU 102 inputs the MODE1 signal and the CW_CCW signal set at prescribed levels, in accordance with the stepping motor and its direction of rotation, to driver IC 150.

At step 404, CPU 102 starts an operation of accelerating the stepping motor to a prescribed speed of rotation. Specifically, CPU 102 inputs a phase-advancing clock signal CLK to driver IC 150, and sets ENABLE signal to the high level. Consequently, from driver IC 150, H bridge signal having the frequency of 82 kHz is output to the stepping motor, and the rotation of stepping motor is accelerated.

At step 406, CPU 102 determines whether acceleration is to be terminated. Here, the stepping motor is subjected to open-loop control and CPU 102 counts (for example, counts up) the number of steps of the control signal (the number of CLK signal pulses) starting from when the ENABLE signal is set to the high level and determines whether the number of steps has reached a prescribed value or higher (number of steps≥prescribed value). If it is determined that the number of steps has reached the prescribed value or higher, the control proceeds to step 408. Otherwise, step 406 is repeated. The prescribed value is set in advance in accordance with a target speed of rotation and stored, for example, in HDD 108. CPU reads this value and uses it as a reference for determination. The counting may be count-down from the prescribed value, and whether the number of steps has reached 0 or lower (number of steps≤0) may be determined.

At step 408, CPU 102 sets the PWM frequency of driver IC 150 to the second frequency. Specifically, CPU 102 sets the ENABLE signal to the low level, and sets the frequency switching signal CF to the low level. Thus, the PWM frequency is set to 24 kHz, lower than the first frequency (82 kHz).

At step 410, CPU 102 rotates the stepping motor at a constant speed. Specifically, CPU 102 inputs phase-advancing clock signal CLK of a constant period to driver IC 150, and sets the ENABLE signal to the high level. Consequently, H bridge signal having the frequency of 24 kHz is output from driver IC 150 to the stepping motor, and the speed of rotation of the stepping motor is maintained.

At step 412, CPU 102 determines whether the control of constant speed is to be terminated. The time period in which the constant speed is maintained is the period for conveying the document at a constant speed. If the time period for maintaining the constant speed is determined in terms of the number of steps in advance, CPU 102 counts the number of steps of the control signal from when the ENABLE signal is set to the high level as at step 406, and determines whether the control of constant speed is to be maintained or not, depending on whether the number of steps has reached a prescribed number or higher (number of steps≥prescribed value). If it is determined that control of constant speed is to be terminated, the control proceeds to step 414. Otherwise, step 412 is repeated.

At step 414, CPU 102 sets the ENABLE signal to the low level, and sets the PWM frequency of driver IC 150 to the first frequency. Specifically, CPU 102 sets the frequency switching signal CF to the high level. Thus, the PWM frequency is set to 82 kHz, as described above.

At step 416, CPU 102 decelerates the speed of rotation of stepping motor. Specifically, CPU 102 inputs phase-advancing clock signal CLK to driver IC 150, and sets the ENABLE signal to the high level. Thus, H bridge signal having the frequency of 82 kHz is output to the stepping motor, and the rotation of stepping motor is decelerated.

At step 418, CPU 102 determines whether or not the deceleration control is to be terminated. CPU 102 counts the number of steps of the control signal from when the ENABLE signal is set to the high level, and determines whether or not the number of steps has reached a prescribed value or higher (step number≥prescribed number). If it is determined that the number of steps has reached the prescribed number or higher, the control proceeds to step 420. Otherwise, step 418 is repeated. The prescribed number is set beforehand in accordance with the time period of deceleration from a target speed of rotation to zero, and stored, for example, in HDD 108. CPU reads this and uses it as a reference for determination.

At step 420, CPU 102 executes the end process. Specifically, CPU 102 sets the ENABLE signal to the low level, and stops the present program. At this time, it is also possible to set other control signal or signals to the initial value.

In the above-described manner, when the rotation of stepping motor is started (accelerating period) and stopped (decelerating period), the stepping motor can be controlled with the PWM frequency higher than at the time of rotation at a constant speed.

Though the program ends after step 420 in the example above, when a plurality of documents are to be conveyed successively, the control may be returned to step 402 at prescribed timing. In that case, steps 402 to 420 are repeated by the number of document sheets, and then the program ends.

Figure 7:
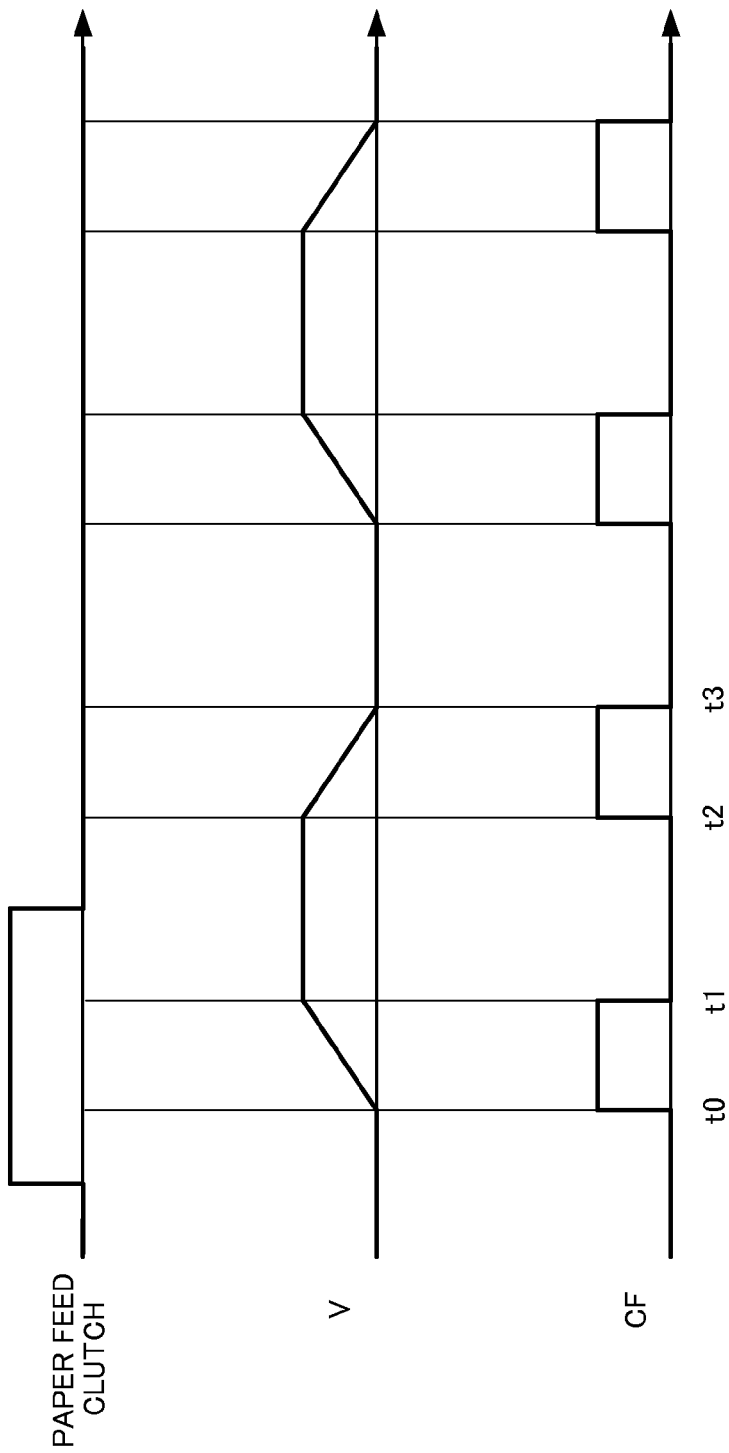
FIG. 7 is a timing chart representing stepping motor control timings.

FIG. 7 is a timing chart representing the above-described control. Three waveforms represent, from the top, levels of a control signal of a paper feed clutch, the speed of rotation V of conveyer roller pair, and the frequency switching signal CF. First, the control signal of paper feed clutch is set to the high level, and the paper feed clutch couples the paper feed roller and the stepping motor (step 400). In a time period from t0 to t1, frequency switching signal CF is set to the high level, and the rotation of conveyer roller is accelerated (steps 402 to 406). In a time period from t1 to t2, frequency switching signal CF is set to the low level, and the rotation of conveyer roller at a constant speed is maintained (steps 408 to 412). The paper feed clutch need to be coupled only while the document is drawn in, and hence, after the document is drawn in, the clutch control signal is set to the low level, and coupling of paper feed clutch is released. In a time period from t2 to t3, frequency switching signal CF is set to the high level, and the rotation of conveyer roller is decelerated until it stops (steps 414 to 418). Then, the same process is repeated as needed and the document is conveyed.

Figure 8:
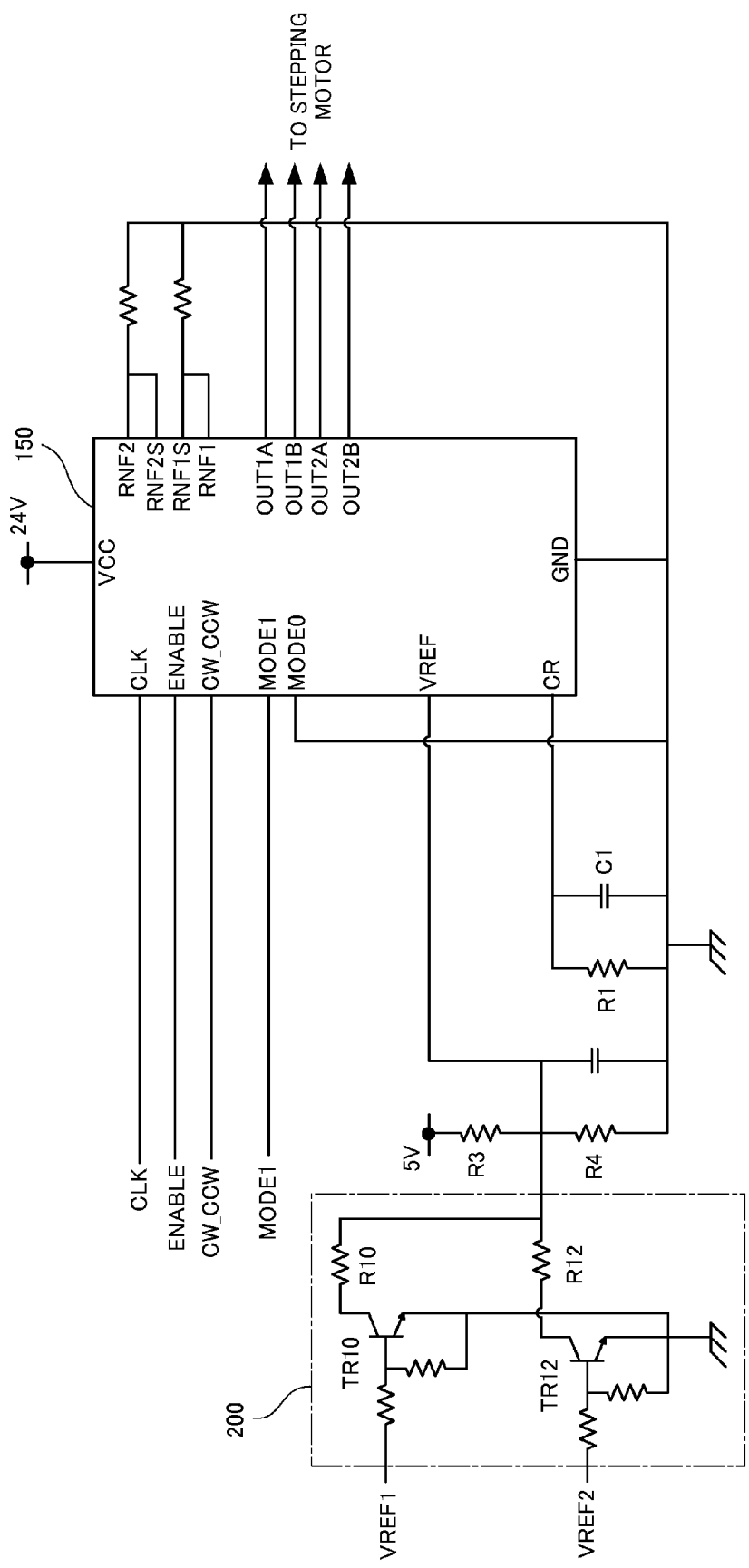
FIG. 8 is a circuit diagram showing a circuit conventionally used for controlling the stepping motor.

In the following, a description will be given of effectiveness of the present invention described by comparison with a conventional technique. FIG. 8 shows a conventional control circuit using the same stepping motor driver IC 150 as shown in FIG. 5. In the circuit of FIG. 8, frequency switching circuit 152 is removed, and a current switching circuit 200 for controlling a current value is added. Meanings of various terminals of driver IC 150 and the set signal levels are the same as those described above. Therefore, only the differences will be described.

In the circuit shown in FIG. 8, PWM frequency is set to a fixed value by a resistor R1 and a capacitor C1 connected between the CR terminal and the ground. On/off of two transistors TR10 and TR12 of current switching circuit 200 are set by first and second current switching signals VREF1 and VREF2 from CPU 102, respectively. When the first current switching signal VREF1 is set to the high level and the second current switching signal VREF2 is set to the low level, transistor TR10 turns on and transistor TR12 turns off. Thus, the VREF terminal is set to a voltage determined by dividing 5V by resistors R3, R4 and R10 (by a configuration in which resistors R4 and R10 are connected in parallel and resistor R3 is connected in series thereto). When the first current switching signal VREF1 is set to the low level and the second current switching signal VREF2 is set to the high level, transistor TR10 turns off and transistor TR12 turns on. Thus, the VREF terminal is set to a voltage determined by dividing 5V by resistors R3, R4 and R12 (by a configuration in which resistors R4 and R12 are connected in parallel and resistor R3 is connected in series thereto).

Therefore, when resistors R10 and R12 are adapted to have different resistance values, it becomes possible to change the level of the VREF terminal by controlling the first and second current switching signals VREF1 and VREF2 and thereby to change the output current value of driver IC 150.

Figure 9:
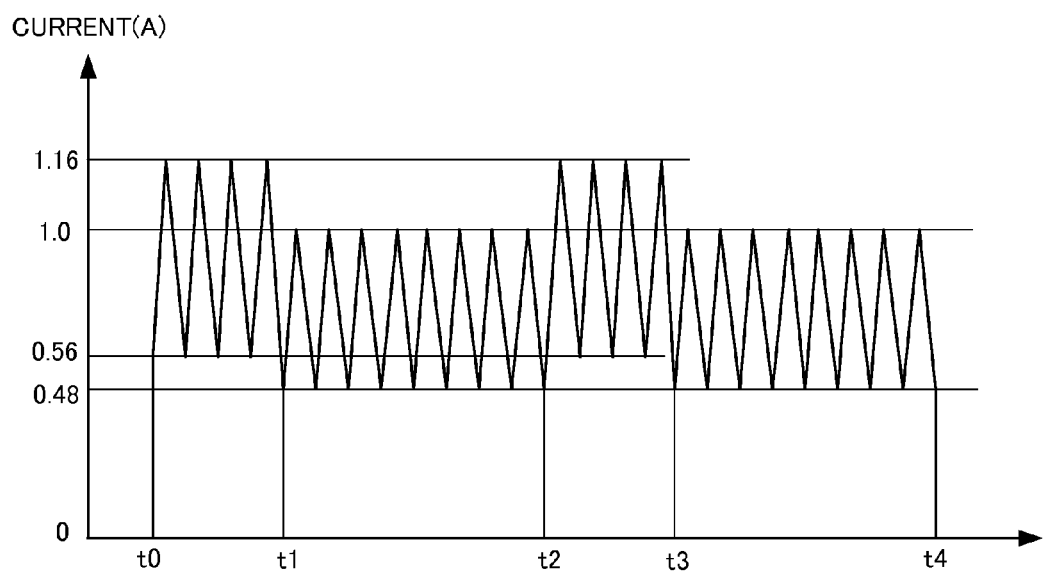
FIG. 9 is a graph showing a result of control of the stepping motor by the circuit shown in FIG. 8.

FIG. 9 shows current waveforms when the stepping motor is controlled by the control circuit shown in FIG. 8. In FIG. 9, the PWM frequency is constant (24 kHz), time periods from t0 to t1 and t2 to t3 are accelerating or decelerating period of the stepping motor, and the time periods from t1 to t2 and t3 to t4 are the period of rotation at a constant speed of the stepping motor (constant-speed period). As to the stepping motor driving current, the current value in periods t0 to t1 and t2 to t3 is higher than that in periods t1 to t2 and t3 to t4. Specifically, the maximum current value in the accelerating period (decelerating period) is 1.16 A, which is higher than 1.0 A in the constant-speed period. The ripple current, which is a difference between the maximum current value (1.16A) and the minimum current value (0.56A) in the accelerating period (decelerating period), is 0.6 A. Assuming that the internal resistance in driver IC 150 is 1Ω, power loss is 1.3 W. In the constant-speed period, the minimum current value is 0.48 A. Effective current value in periods t0 to t1 and t2 to t3 is 0.86 A, and in periods t1 to t2 and t3 to t4, it is 0.74 A.

Figure 10:
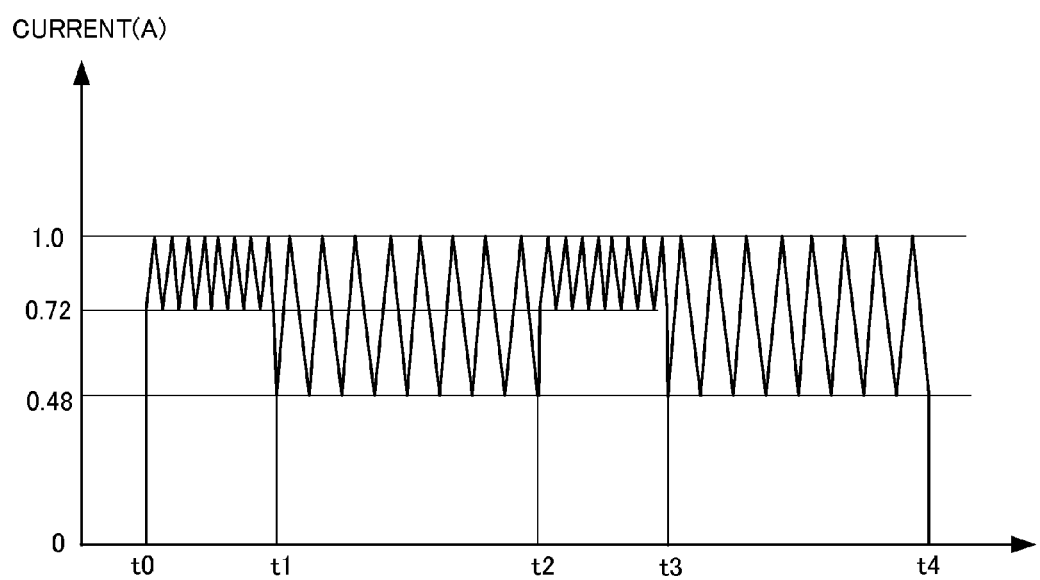
FIG. 10 is a graph showing a result of control of the stepping motor by the circuit shown in FIG. 5.

FIG. 10 shows current waveforms when the stepping motor is controlled by the control circuit shown in FIG. 5. In FIG. 10, time periods from t0 to t1 and t2 to t3 are accelerating or decelerating period of the stepping motor, and the time periods from t1 to t2 and t3 to t4 are constant-speed period. As described above, the PWM frequency of periods t0 to t1 and t2 to t3 is higher than the PWM frequency in periods t1 to t2 and t3 to t4. The maximum current value is always constant at 1.0 A, in any periods, that is, in accelerating (decelerating) period and in constant-speed period. In the accelerating (decelerating) period, the minimum current value is 0.72 A, and the ripple current is 0.28 A. The power loss is 1.0 W. The minimum current value in the constant-speed period is 0.48 A. The effective current in periods t0 to t1 and t2 to t3 is 0.86 A, and the effective current value in periods t1 to t2 and t3 to t4 is 0.74 A.

When we compare FIGS. 9 and 10, the effective current values in the corresponding periods are the same. It is noted, however, in FIG. 10 representing the result when the circuit of FIG. 5 is used, the power loss of driver IC 150 is smaller than in FIG. 9 representing the result when the circuit of FIG. 8 is used. Further, the ripple current value is smaller in FIG. 10 than in FIG. 9. Therefore, it can be seen that when the stepping motor is driven by driver IC 150, the method of control in which the PWM frequency in the accelerating (decelerating) period is switched to be higher than in the constant-speed period is superior than the method of control in which the current value is changed.

Though the end of constant-speed control is determined based on the number of steps at step 412 in the foregoing, this is not limiting. By way of example, whether the constant-speed control is to be terminated or not may be determined by receiving a signal from a sensor detecting a document, provided close to the conveyer roller. Specifically, when it is detected that the trailing edge of a document has passed over the roller, it may be determined to end the constant-speed control.

Though an example in which a stepping motor provided in automatic document feeder 114 is controlled has been described above, it is not limiting. Stepping motors for driving paper conveying rollers, arranged in image forming unit 118, paper feed unit 130 and paper discharge unit 132 may be controlled by motor control unit 112 shown in FIG. 5. Further, the stepping motor for driving the first and second scanning units 45 and 46 included in document reading unit 116 may be controlled by motor control unit 112 shown in FIG. 5.

Though an example in which CPU 102 controlling image processing apparatus 100 as a whole controls driver IC 150 has been described above, it is not limiting. A micro-computer controlling driver IC 150 may be provided separate from CPU 102. In that case, the micro-computer may control driver IC 150 in response to an instruction to start control from CPU 102.

Second Embodiment

In the first embodiment, the stepping motor control device controls the stepping motor with the same PWM frequency both in the accelerating and decelerating periods. In the second embodiment, different PWM frequencies are used in the accelerating and decelerating periods.

The image processing apparatus in accordance with the present embodiment has the configurations shown in FIGS. 1 to 4, similar to the image processing apparatus in accordance with the first embodiment. The object of control of motor control unit 112 is the stepping motor included in automatic document feeder 114. Different from the first embodiment, in the present embodiment, a circuit shown in FIG. 11 is used in place of the circuit shown in FIG. 5, as the motor control unit 112.

Figure 11:
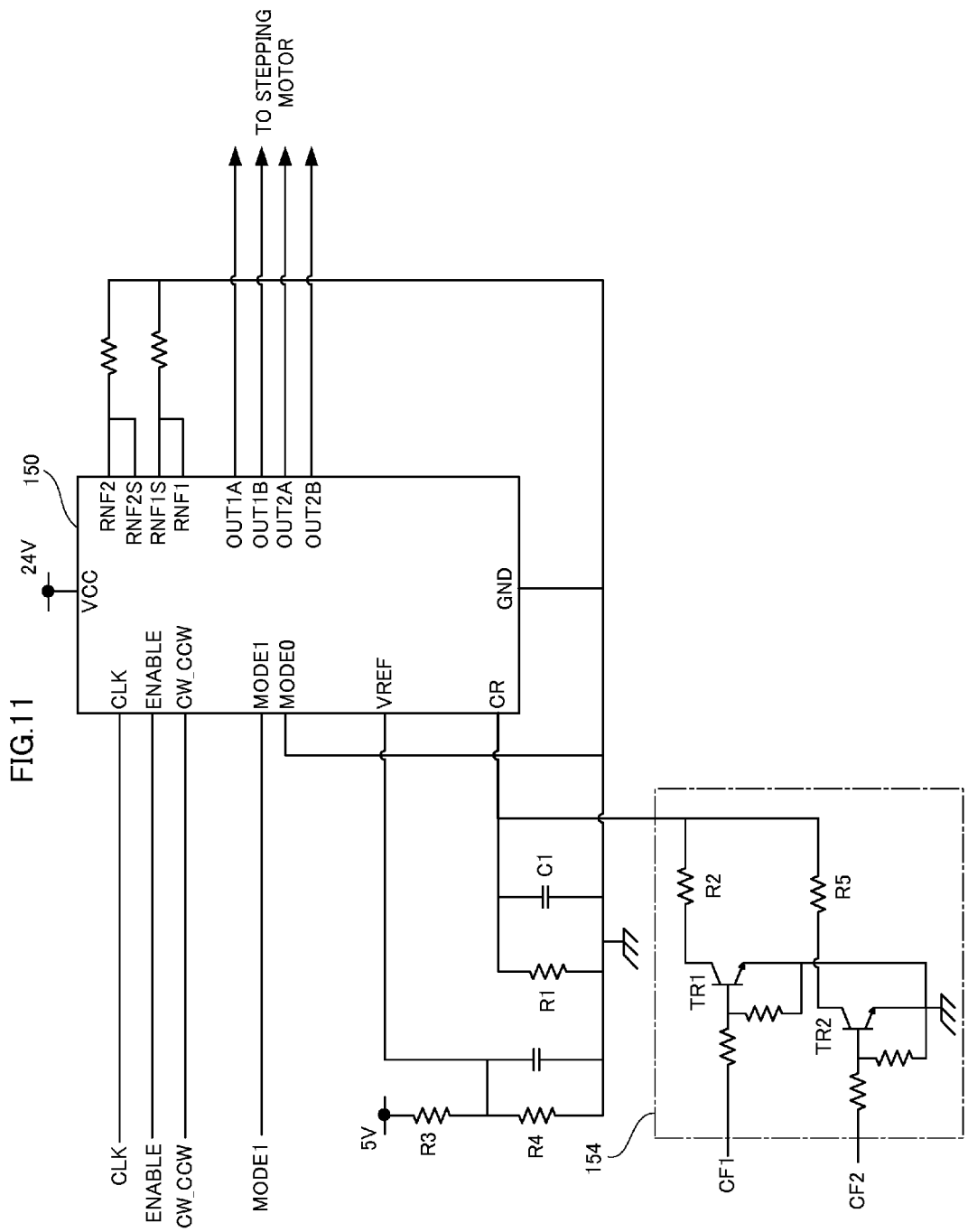
FIG. 11 is a circuit diagram showing a motor control unit different from that of FIG. 5, constituting the stepping motor control device in accordance with the second embodiment of the present invention.

Referring to FIG. 11, a frequency switching circuit 154 is a circuit for changing resistance value between the CR terminal and the ground. Frequency switching circuit 154 is formed by adding a circuit portion including a transistor TR2 and a resistor R5, to frequency switching circuit 152 of FIG.

5. Here, as in the first embodiment (FIG. 5), capacitor C1=470 (pF), resistor R1=39 (kΩ), and resistor R2=15 (kΩ). Resistor R5=39 (kΩ).

To frequency switching circuit 154, a first frequency switching signal CF1 and a second frequency switching signal CF2 from CPU 102 are input. The first and second frequency switching signals CF1 and CF2 control on/off of transistors TR1 and TR2, respectively.

When the first frequency switching signal CF1 at the low level and the second frequency signal CF2 at the low level are input, transistors TR1 and TR2 turn off. Therefore, there will be resistor R1 connected between the CR terminal and the ground. Here, the PWM frequency is 24 kHz, as in the first embodiment (FIG. 5).

When the first frequency switching signal CF1 at the low level and the second frequency signal CF2 at the high level are input, transistor TR1 turns off and transistor TR2 turns on. Therefore, between the CR terminal and the ground, resistors R1 and R5 are connected in parallel. The combined resistance of parallel-connected resistors R1 and R5 is 19.5 kΩ, and the PWM frequency is 48 kHz.

When the first frequency switching signal CF1 at the high level and the second frequency signal CF2 at the low level are input, transistor TR1 turns on and transistor TR2 turns off. Therefore, between the CR terminal and the ground, resistors R1 and R2 are connected in parallel. The combined resistance value of parallel-connected resistors R1 and R2 is 10.8 kΩ, and the PWM frequency is 82 kHz, which is the same as in the first embodiment (FIG. 5).

In this manner, by the levels to which the first and second frequency switching signals CF1 and CF2 are set, the PWM frequency can be changed.

Figure 12:
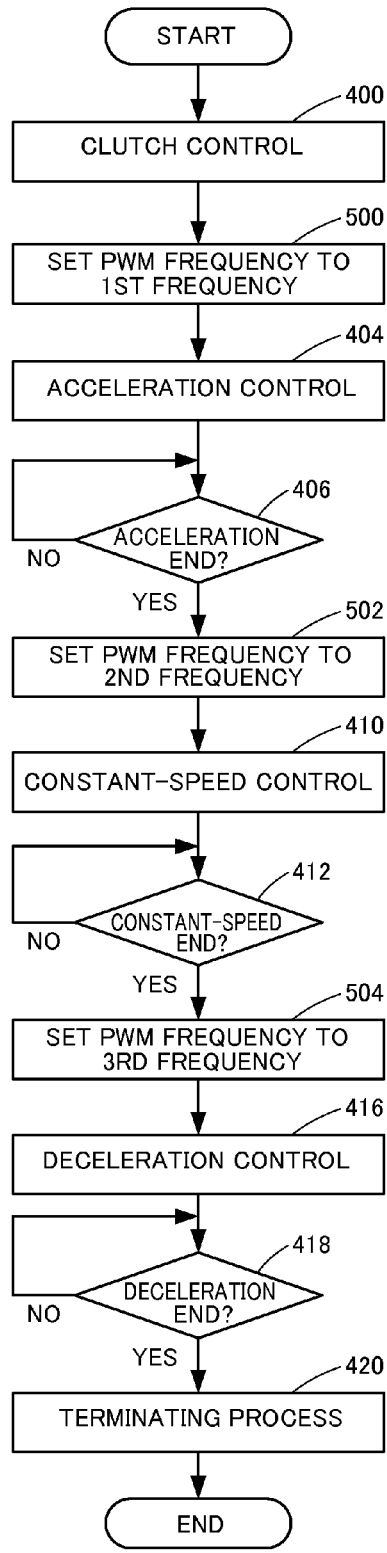
FIG. 12 is a flowchart representing a control structure of a stepping motor control program using the motor control unit shown in FIG. 11.

Referring to FIG. 12, a description will be given of a program controlling stepping motor 140 using motor control unit 112 shown in FIG. 11 while image processing apparatus 100 executes a prescribed function. The program is activated when automatic document feeder 114 is used.

The flowchart of FIG. 12 is different from that of FIG. 6 simply in that steps 402, 408 and 414 are replaced by steps 500, 502 and 504, respectively.

At step 400, the clutch is controlled and, thereafter, at step 500, CPU 102 sets the PWM frequency of driver IC 150 to the first frequency. Specifically, CPU 102 sets the first frequency switching signal CF1 to the high level, and sets the second frequency switching signal CF2 to the low level. Consequently, the PWM frequency is set to 82 kHz (first frequency), as described above. Further, CPU 102 sets MODE1 signal and CW_CCW signal to prescribed levels in accordance with the stepping motor and the direction of rotation.

If it is determined at step 406 that the accelerating period ended, at step 502, CPU 102 sets the PWM frequency of driver IC 150 to the second frequency. Specifically, CPU 102 sets the ENABLE signal to the low level, and sets the first and second frequency switching signals CF1 and CF2 to the low level. Consequently, the PWM frequency is set to 24 kHz (second frequency), lower than the first frequency (82 kHz), as described above.

If it is determined at step 412 that the constant-speed period ended, at step 504, CPU 102 sets the PWM frequency of driver IC 150 to a third frequency. Specifically, it sets the ENABLE signal to the low level, sets the first frequency switching signal CF1 to the low level, and sets the second frequency switching signal CF2 to the high level. Consequently, the PWM frequency is set to 48 kHz (third frequency), which is higher than the second frequency (24 kHz) and lower than the first frequency (82 kHz).

In the above-described manner, when the rotation of stepping motor is to be started (accelerating period) and to be stopped (decelerating period), it is possible to control the stepping motor at the PWM frequency higher than the PWM frequency when the motor is rotating at a constant speed, and it is also possible to set the PWM frequencies in the accelerating period and the decelerating period to different values. Depending on the object driven by the stepping motor, it is preferable to control with different PWM frequencies in the accelerating and decelerating periods. In such a situation, the present embodiment is effective.

Though an example has been given in which the PWM frequency in the accelerating period of the stepping motor is higher than the PWM frequency in the decelerating period of the stepping motor, it is not limiting. The PWM frequency in the decelerating period of the stepping motor may be higher than the PWM frequency in the accelerating period of the stepping motor.

Third Embodiment

In the stepping motor control device in accordance with the first and second embodiments, the stepping motor is subjected to open-loop control, and the end of accelerating period is determined by the number of steps (the number of CLK signal pulses) of the control signal. In the third embodiment, information related to the speed of rotation is fed-back from the stepping motor, and using this, the end of accelerating period is determined.

Figure 13:
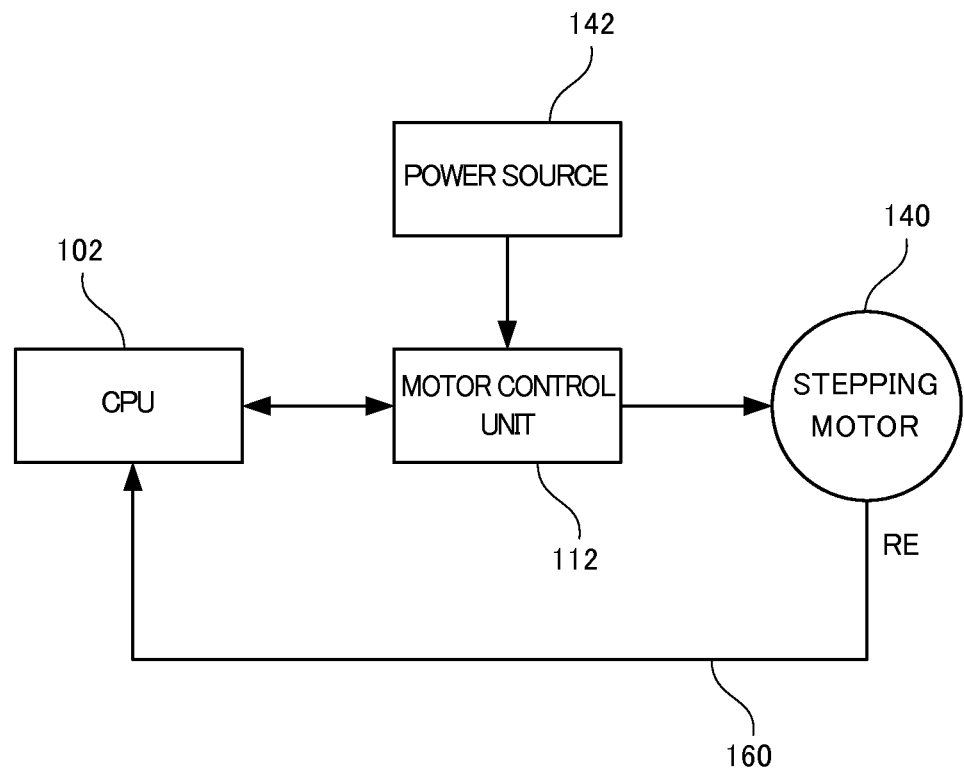
FIG. 13 is a block diagram showing a stepping motor control device in accordance with a third embodiment of the present invention.

Similar to the image processing apparatus in accordance with the first embodiment, the image processing apparatus in accordance with the present embodiment has the configuration shown in FIGS. 1 to 3. In the present embodiment, different from FIG. 4 of the first embodiment, the stepping motor control device is structured as shown in FIG. 13. Motor control unit 112 is the same as that shown in FIG. 11, and the object of control of motor control unit 112 is the stepping motor included in automatic document feeder 114.

Referring to FIG. 13, an encoder (not shown) for detecting the speed of rotation of motor is attached to stepping motor 140, and it outputs an encode signal RE representing the speed of rotation (rpm) of stepping motor 140. The encode signal RE is input through a feedback line 160 to CPU 102.

Figure 14:
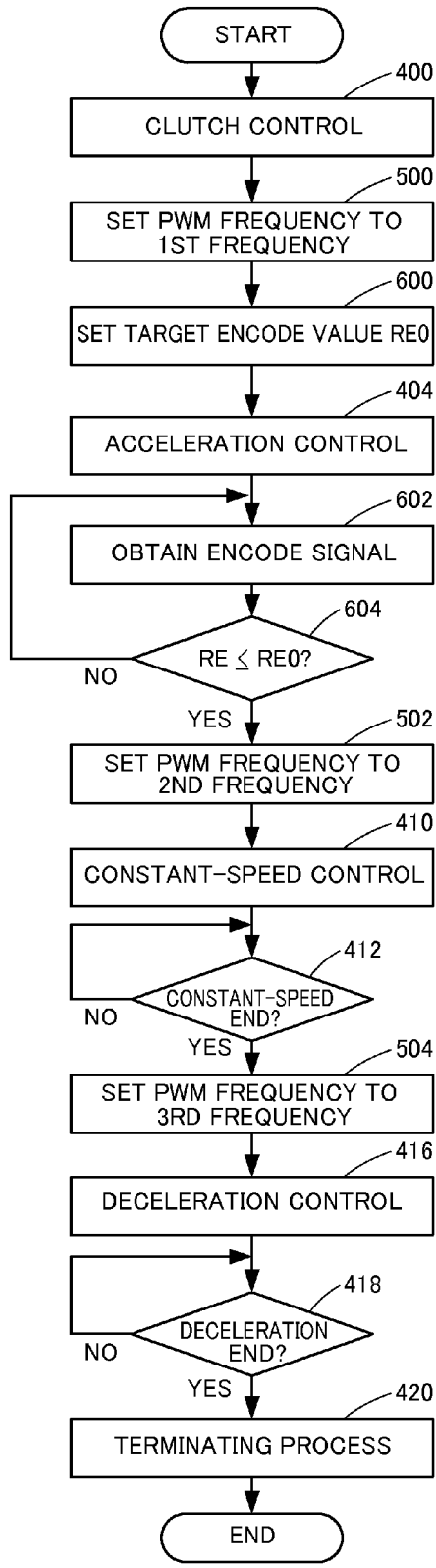
FIG. 14 is a flowchart representing a control structure of the program executed by the stepping motor control device shown in FIG. 13.

Referring to FIG. 14, a description will be given of a program controlling stepping motor 140 using the configuration shown in FIG. 13 while image processing apparatus 100 executes a prescribed function. The program is activated when automatic document feeder 114 is used.

The flowchart of FIG. 14 is different from that of FIG. 12 (second embodiment) simply in that steps 600 and 602 are added and step 406 is replaced by step 604.

At step 500, the PWM frequency is set to the first frequency, and thereafter, at step 600, CPU 102 reads an encode value RE0, as a reference used in a determining process, which will be described later, from, for example, HDD 108 and stores it in a prescribed area of RAM 106. The encode value RE0 is determined in advance, from a target speed of rotation.

At step 404, acceleration control starts, and thereafter, at step 602, CPU 102 obtains the encode signal RE from stepping motor 140.

At step 604, CPU 102 determines whether the value of encode signal RE obtained at step 602 is equal to or lower than the target encode value RE0 stored in RAM 106 (RE≤RE0). If it is determined that RE RE0, the control proceeds to step 502. Otherwise, the control returns to step 602, and steps 602 and 604 are repeated.

In the above-described manner, it is possible to determine the end of accelerating period of the stepping motor from the actual number of rotations of the stepping motor, without the necessity of counting the number of steps of the control signal of driver IC 150.

Though a description has been given of an example in which the encode signal RE from stepping motor 140 is used for determining the end of accelerating period of stepping motor 140, it is not limiting. An encode signal RE from stepping motor 140 may be used for determining the end of decelerating period of stepping motor 140.

Though a description has been given of an example in which an encoder detecting the speed of rotation of the stepping motor and outputting a signal representing the speed of rotation is used, it is not limiting. A rotary encoder that detects the amount of rotation may be used. In that case, CPU can calculate the speed of rotation of the motor from the encode signal obtained from the rotary encoder, and use it for determining, for example, the end of accelerating period.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A stepping motor control device, comprising:
   a driving unit driving said stepping motor by PWM control; and
   a control unit controlling said driving unit; wherein
   said control unit controls said driving unit such that
   in a period in which said stepping motor is kept rotating at a constant speed, said driving unit drives said stepping motor with a first PWM frequency, and
   in a period of accelerating or decelerating rotation of said stepping motor, said driving unit drives said stepping motor with a second PWM frequency,
   said second PWM frequency being higher than said first PWM frequency.

2. The control device according to claim 1, wherein said control unit controls said driving unit such that said stepping motor is driven with a PWM frequency in the period of accelerating rotation of said stepping motor different from a PWM frequency in the period of decelerating rotation of said stepping motor.

3. The control device according to claim 1, wherein said control unit determines an end of the period in which said stepping motor is kept rotating at said constant speed, an end of the period of accelerating or an end of the period of decelerating, by counting the number of control steps of said driving unit.

4. The control device according to claim 1, further comprising
   a detecting unit detecting speed of rotation of said stepping motor; wherein
   said control unit determines an end of the period in which said stepping motor is kept rotating at said constant speed, an end of the period of accelerating or an end of the period of decelerating, by the speed of rotation of said stepping motor detected by said detecting unit.

5. A conveying device, comprising:
   the control device according to claim 1; and
   a stepping motor; wherein
   said stepping motor conveys an object, under the control by said control device.

\* \* \* \* \*